(12) United States Patent
Yen

(10) Patent No.: US 9,884,713 B2
(45) Date of Patent: Feb. 6, 2018

(54) PACKING BOX

(71) Applicant: International Design Packing Co., LTD., Suzhou (CN)

(72) Inventor: Wentai Yen, Suzhou (CN)

(73) Assignee: INTERNATIONAL DESIGN PACKAGING CO., LTD., Suzhou (CN)

( * ) Notice: Subject to any disclaimer, the term of this patent is extended or adjusted under 35 U.S.C. 154(b) by 0 days.

(21) Appl. No.: 14/781,027

(22) PCT Filed: Dec. 2, 2014

(86) PCT No.: PCT/CN2014/092838
§ 371 (c)(1),
(2) Date: Sep. 28, 2015

(87) PCT Pub. No.: WO2016/061871
PCT Pub. Date: Apr. 28, 2016

(65) Prior Publication Data
US 2016/0325906 A1    Nov. 10, 2016

(30) Foreign Application Priority Data

Oct. 24, 2014    (CN) .......................... 2014 1 0578543

(51) Int. Cl.
*B65D 77/04*    (2006.01)
*B65D 5/42*    (2006.01)
(Continued)

(52) U.S. Cl.
CPC ....... *B65D 77/0433* (2013.01); *B65D 5/2009* (2013.01); *B65D 5/22* (2013.01);
(Continued)

(58) Field of Classification Search
CPC .......................... B65D 77/0433; B65D 5/2009; B65D 5/4279; B65D 5/5054
(Continued)

(56) References Cited

U.S. PATENT DOCUMENTS 3,034,697 A * 5/1962 Frankenstein ....... B65D 5/2009
229/167
3,539,094 A * 11/1970 Collura ................ B65D 5/2009
229/167
(Continued)

FOREIGN PATENT DOCUMENTS

CN    2352454    12/1999
CN    2579810 Y    10/2003
(Continued)

OTHER PUBLICATIONS

European Search Report, 14885846, dated Nov. 30, 2016.

*Primary Examiner* — Christopher Demeree

(57) ABSTRACT

The present disclosure discloses a packing box in the field of outer packing technique in view of problems that the existing thick packing box occupies large space in transporting and storage and cannot be reused after disassembled due to adhering connections. The packing box includes two cover bodies configured to snap one another, each of the cover bodies is formed by a folded plate member, and the plate member includes an internal flexible layer, an external flexible layer and a paperboard layer therebetween, where the cover body includes a bottom plate, and a side plate and a flipping plate both arranged on each of opposite sides of the bottom plate, one side of the side plate is connected to the bottom plate, and the other side of the side plate is connected to the flipping plate, so that the side plate is foldable with respect to a side edge of the bottom plate that is connected with the side plate, and the flipping plate is foldable with respect to a side edge of the side plate that is
(Continued)

connected with the flipping plate. A locating structure is arranged between the bottom plate and the side plate, and a free end of the flipping plate is configured to be inserted and fixed to the locating structure. Since adhering connections are avoided in the assembling of the packing box, the production efficiency is increased, and the packing box is easy to disassemble and assemble and may be reused, so that the cover body can be disassembled to save space for transporting and storage.

10 Claims, 4 Drawing Sheets

(51) Int. Cl.
    *B65D 5/50*     (2006.01)
    *B65D 5/20*     (2006.01)
    *B65D 5/68*     (2006.01)
    *B65D 5/22*     (2006.01)
    *B65D 65/40*     (2006.01)

(52) U.S. Cl.
    CPC .......... *B65D 5/4204* (2013.01); *B65D 5/4279* (2013.01); *B65D 5/5054* (2013.01); *B65D 5/68* (2013.01); *B65D 65/40* (2013.01); *Y02W 30/801* (2015.05)

(58) Field of Classification Search
    USPC .......... 229/167, 165, 178, 918, 174, 122.32, 229/172, 177, 186, 919, 190, 143, 154, 229/170, 179, 194, 198.2
    See application file for complete search history.

(56) References Cited

U.S. PATENT DOCUMENTS

| | | | |
|---|---|---|---|
| 3,543,994 A | | 12/1970 | Clark |
| 3,985,230 A | | 10/1976 | Meyer et al. |
| 4,573,633 A | * | 3/1986 | Brian ........................ B65D 5/22 229/167 |
| 5,454,471 A | * | 10/1995 | Norvell .................. A47J 47/145 126/400 |
| 6,179,204 B1 | | 1/2001 | Blower |
| 2007/0251985 A1 | * | 11/2007 | Boase .................. B65D 5/2009 229/167 |
| 2008/0296356 A1 | | 12/2008 | Hatcher |
| 2010/0294831 A1 | * | 11/2010 | Hallam .................. B65D 5/248 229/122.32 |
| 2013/0299566 A1 | | 11/2013 | Sylvester |

FOREIGN PATENT DOCUMENTS

| | | |
|---|---|---|
| CN | 201049756 | 4/2008 |
| CN | 201400344 | 2/2010 |
| CN | 104044785 A | 9/2014 |
| EP | 0108537 A1 | 5/1984 |
| FR | 2236734 A1 | 2/1975 |

* cited by examiner

PACKING BOX

CROSS-REFERENCES TO RELATED APPLICATIONS

This disclosure claims priority to Chinese Patent Application No. 201410578543.1, filed on Oct. 24, 2014 in the name of International Design Packing Co., Ltd, and entitled "Packing Box", the disclosure of which is incorporated herein by reference in its entirety.

FIELD OF THE INVENTION

The present disclosure relates to the field of outer packing technique, and in particular to a pocking box.

BACKGROUND OF THE INVENTION

The packing box, which is used to pack various kinds of objects, is a common article in people's daily life. In order to improve the structural reliability and aesthetic property of the packing box, the packing box is generally made of a relatively thick material by way of adhering, and a shape of the resultant packing box is constant. However, such packing box occupies large space in transporting and storage, thereby wasting the space and increasing costs for the storage and the transporting.

As shown in FIG. 1, in order to save the space, a folding packing box is designed. To put the folding packing box in use, two opposite sides of the folding packing box are folded and four corners of the folding packing box are adhered, but the folding packing box with such structure has the following defects that:

(1) the structure of the folding packing box is complicated because an additional layer of paper is internally adhered to the folding packing box, thereby negatively affecting the efficiency and costs of the production of the packing box; and (2) due to the fixation manner by adhering, the assembled packing box not in use cannot be disassembled into its original sheet structure, and hence is unconvenient for use and storage.

SUMMARY OF THE INVENTION

An object of the present disclosure is to provide a packing box, which has a simple and reliable structure, occupies small space in transporting and storage, and can be assembled (or constructed) without adhering, thus, the packing box is convenient to assemble and disassemble (or deconstruct) and may be used repeatedly.

To this end, the present disclosure proposes the following technical solutions.

A packing box composing two cover bodies configured to snap one another, wherein each of the cover bodies is formed by folded a plate member, and the plate member includes an internal flexible layer, an external flexible layer and a paperboard layer between the internal flexible layer and the external flexible layer;

the cover body includes a bottom plate, and a side plate and a flipping plate both arranged on each of at least two paired opposite sides of the bottom plate, where one side of the side plate is connected to the bottom plate, and the other side of the side plate is connected to the flipping plate, so that the side plate is foldable with respect to a side edge of the bottom plate that is connected with the side plate, and the flipping plate is foldable with respect to a side edge of the side plate that is connected with the flipping plate;

a locating structure is arranged between the bottom plate and the side plate, and a free end of the flipping plate is configured to be inserted and fixed to the locating structure.

Preferably, the locating structure is a step structure arranged on each of at least two paired of opposite sides of the bottom plate, and the free end of the flipping plate is configured to abut on a step surface of the step structure.

Preferably, the paperboard layer includes a first paperboard layer unit, and a second paperboard layer unit and third paperboard layer unit both arranged on each of at least two paired of opposite sides of the first paperboard layer unit in an order from inside to outside of the cover body, a gap is arranged between the first paperboard layer unit and the second paperboard layer unit as well as between the second paperboard layer unit and the third paperboard layer unit, and the step structure is arranged on a side edge of the first paperboard layer unit corresponding to the second paperboard layer unit.

Preferably, the step structure is formed by a milling process.

Preferably, the paperboard layer comprises a plurality of sub-layers, and the step structure is formed in forming the paperboard layer with sub-layer of different lengths.

Preferably, the locating structure is formed by grooves arranged on at least one pair of opposite sides of the bottom plate, and the free ends on the flipping plate is insertable into the grooves.

Preferably, a pull tab is fixed to the internal flexible layer of the flipping plate, and a part of the pull tab is exposed when the free end of the flipping plate abuts on the step surface of the step structure.

Preferably, the side plate and the flipping plate are arranged on each of two paired opposite sides of the bottom plate, a closure plate is arranged on each of the other two paired opposite sides of the bottom plate, and the closure plate is foldable with respect to a side edge of the bottom plate that is connected with the closure plate on the bottom plate.

Preferably, a flexible limitation slice is protruded outwards form each of two opposite ends of the closure plate, and a free end of the flexible limitation slice is configured to be attached to the internal flexible layer of the side plate, so that when the free end of the flipping plate abuts on the step surface of the step structure, the closure plate is perpendicular to the bottom plate under the action of the flexible limitation slices.

Perferably, the flipping plate is wider than the side plate by 0.5 mm to 1 mm.

Perferably, a transparent layer is arranged in a central part of the bottom plate of one of the two cover bodies.

The beneficial effects of the present disclosure are described as below.

The packing box of the present disclosure is composed of two cover bodies configured to snap one another, where the cover body is formed by a folded thick plate member, the side plate and the flipping plate are provided at each of at least two paired opposite sides of the bottom plate of each cover body, and the locating structure is arranged between the bottom plate and the side plate. When each side plate is folded inward with respect to the corresponding outer edge of the bottom plate to stand upright, the flipping plate is folded inward with respect to the outer edge of the side plate, and the free end of the flipping plate is inserted and fixed to the locating structure, the cover body is assembled, then the two cover bodies can snap one another to form the entire packing box. Therefore, adhesion is avoided in the assembling of the packing box of the present disclosure, allowing the thick packing box to be foldable. Further, for transporting and storage, the two cover bodies of the packing box of the present disclosure can be disassembled, the flipping plate is separated from the locating structure to unfold the side plate and the flipping plate flat. Therefore, the packing box of the present disclosure is advantageous for its simple structure and easy manufacture, thereby improving the production efficiency, further, the packing box is convenient to disassemble and assemble, may be reused, and occupies small space in transporting and storage, thus saving energy.

REFERENCE NUMERAL LIST

| 1. bottom plate | 2. side plate | 3. flipping plate | 4. closure plate |
| --- | --- | --- | --- |
| 5. step structure | 6. groove | 7. flexible limitation slice | 8. pull tab |
| 9. paperboard layer | 91. first paperboard layer unit | 92. second paperboard layer unit | |
| 93. third paperboard layer unit | | 94. fourth paperboard layer unit | |
| 95. gap | 10. internal flexible layer | 11. external flexible layer | |
| 12. transparent layer | | | |

DETAILED DESCRIPTION OF THE EMBODIMENTS

The technical solution of the present disclosure will be further described hereinafter with reference to the accompanying drawings in combination with embodiments.

First Embodiment

Figure 1:
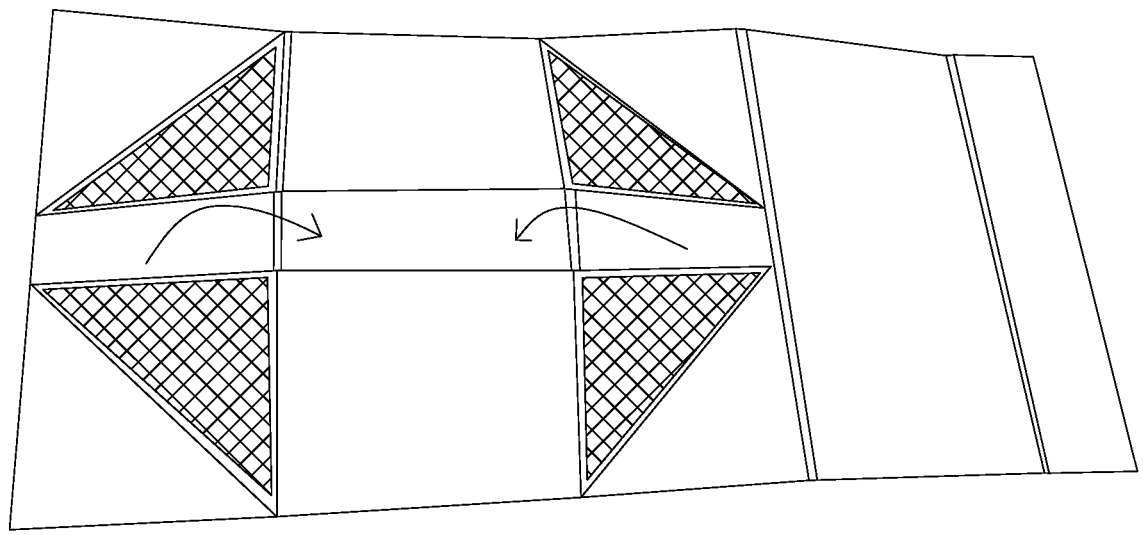
FIG. 1 is a schematic view showing a structure of a folding packing box in a disassembled state in the prior art.
Figure 2:
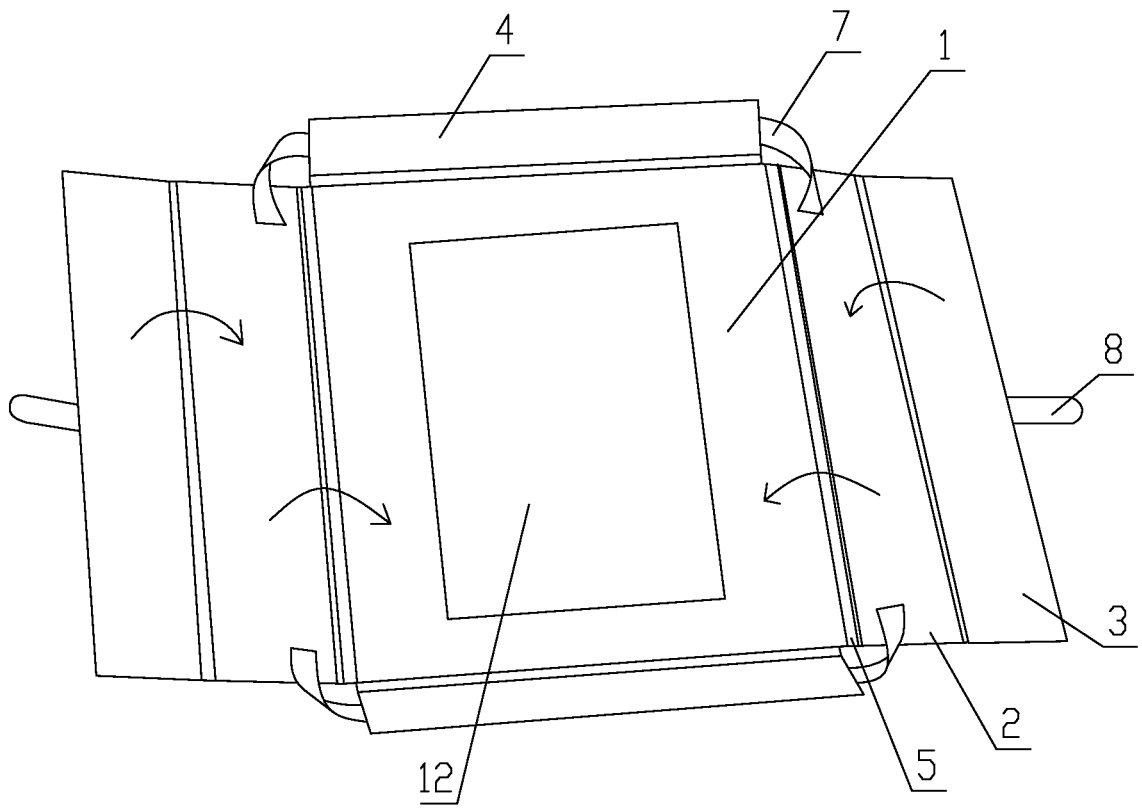
FIG. 2 is a schematic view showing a structure of a packing box in a disassembled state according to a first embodiment of the present disclosure.
Figure 3:
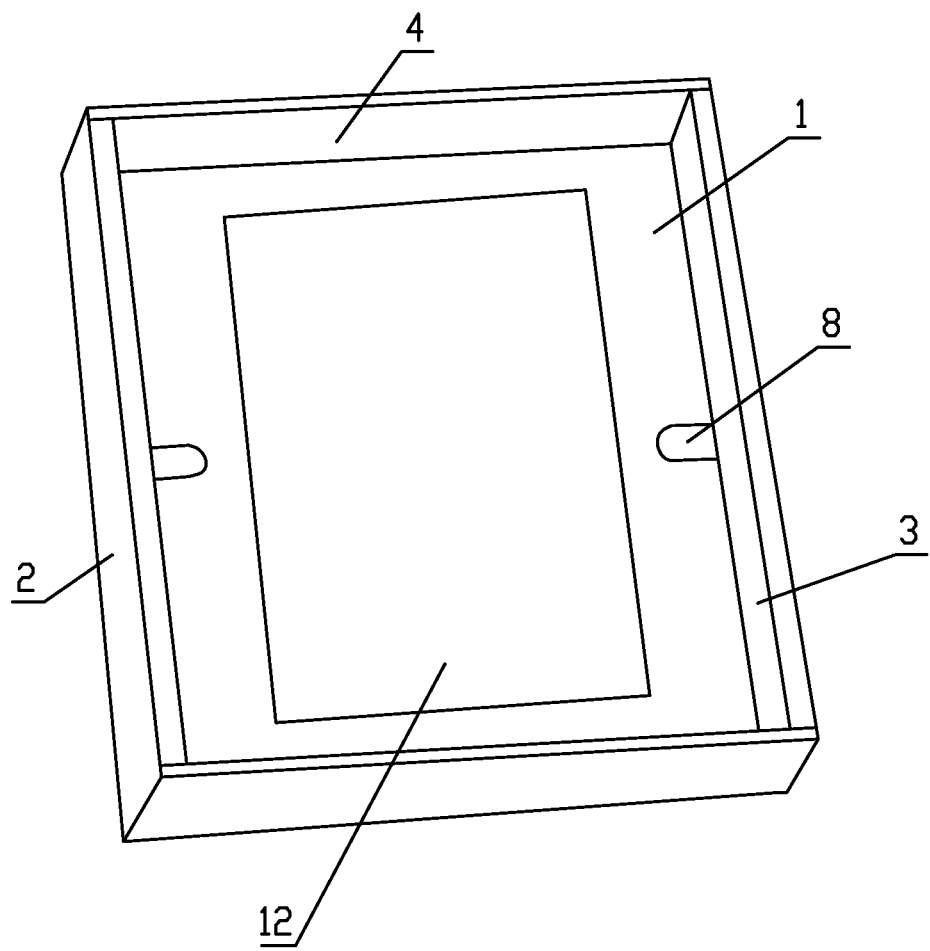
FIG. 3 is a schematic view showing a structure of one assembled cover body of the packing box according to the first embodiment of the present disclosure.

This embodiment provides a packing box composed of two cover bodies which are configured to snap (or nest) one another and have the same structure. As shown in FIGS. 2 and 3, the cover body includes a bottom plate 1, a side plate 2 and a flipping plate 3 both arranged on each of two paired opposite sides of the bottom plate 1, and a closure plate 4 arranged on each of another two paired opposite sides of the bottom plate 1.

One side of the side plate 2 is connected to the bottom plate 1, and the other side of the side plate 2 is connected to the flipping plate 3, so that the side plate 2 is foldable with respect to a side edge of the bottom plate 1 that is connected with the side plate 2, and the flipping plate 3 is foldable with respect to a side edge of the side plate 2 that is connected with the flipping plate 3.

A locating structure is arranged between the bottom plate 1 and the side plate 2, and the flipping plate 3 can be folded so that a free end of the flipping plate 3 is inserted and fixed to the locating structure. In this embodiment, the locating structure is a step structure 5 arranged on a corresponding side edge of the bottom plate 1 that is connected to the side plate 2. After the flipping plate 3 is folded, the free end of the flipping plate 3 abuts on a step surface of the step structure 5 and is fixed thereto. The flipping plate 3 is wider than the side plate 2 by 0.5 mm to 1 mm, such that the top of the flipping plate 3 flushes with the top of the side plate 2 after the flipping plate 3 is fixed onto the step surface of the step structure 5, thereby ensuring the aesthetics of the packing box. In some embodiments, the width of the flipping plate 3 is greater than or equal to the width of the side plate 2 subtracted by the height of the step structure 5, so that the free end of the flipping plate 3 is higher than a step of the step structure 5 and clipped in a step groove of the step structure 5 after being inserted to the step groove.

The closure plate 4 is foldable with respect to a side edge of the bottom plate 1 that is connected with the closure 4. A flexible limitation slice 7 is protruded outwards form each of two opposite ends of the closure plate 4, and a free end of the flexible limitation slice 7 is configured to be attached to an inner surface of the side plate 2. When the flipping plate 3 is folded and fixed, the closure plate 4 is placed perpendicular to the bottom plate 1 under the action of the flexible limitation slices 7. At this time, each flexible limitation slice 7 is placed between the fixed side plate 2 and flipping plate 3, thus the flexible limitation slice 7 is held and fixed between the side plate 2 and the flipping plate 3 to keep the closure plate 4 to be perpendicular with the bottom plate 1.

The assembling processes of the packing box is described as follows. Each side plate 2 is folded toward the inner of the cover body with respect to the outer side edge of the bottom plate 1 by 90° so that the side plate 2 stands upright, and each flipping plate 3 is folded toward the inner of the cover body with respect to the outer side edge of the side plate 2 by 270° so that the free end of the flipping plate 3 abuts on the step surface of the step structure 5 and is fixed thereon. At this time, both the flipping plates 3 and the side plates 2 are perpendicular to the bottom plate 1, and each flexible limitation slice 7 is clipped between the corresponding flipping plate 3 and side plate 2, thus each closure plate 4 is also perpendicular to the bottom plate 1 under the common action of the side plates 2, the flipping plates 3 and the flexible limitation slices 7, to form the cover body. A further cover body can be assembled in the same process. Then, these two assembled cover bodies are snapped together to form an entire packing box, therefore the assembling process is very convenient. To transport and store the packing box, the two cover bodies of the packing box are separated, and the free end of the flipping plate 3 is disengaged from the step structure 5 to unfold the side plate 2 and the flipping plate 3 flat, thereby greatly saving the space occupied by the packing box during the transportation and storage. Further, the entire assembling process does not need adhesion, and thus the disassembling and assembling processes are convenient and the packing box may be used repeatedly, thereby saving energy and resource consumption.

For dissembling the packing box conveniently, a pull tab 8 is arranged on an inner surface of the flipping plate 3, and a part of the pull tab 8 is exposed when the free end of the flipping plate 3 abuts on the step surface of the step structure 5. To disassemble the cover body, the pull tab 8 is pulled to disengage the free end of the flipping plate 3 from the step structure 5.

Figure 4:
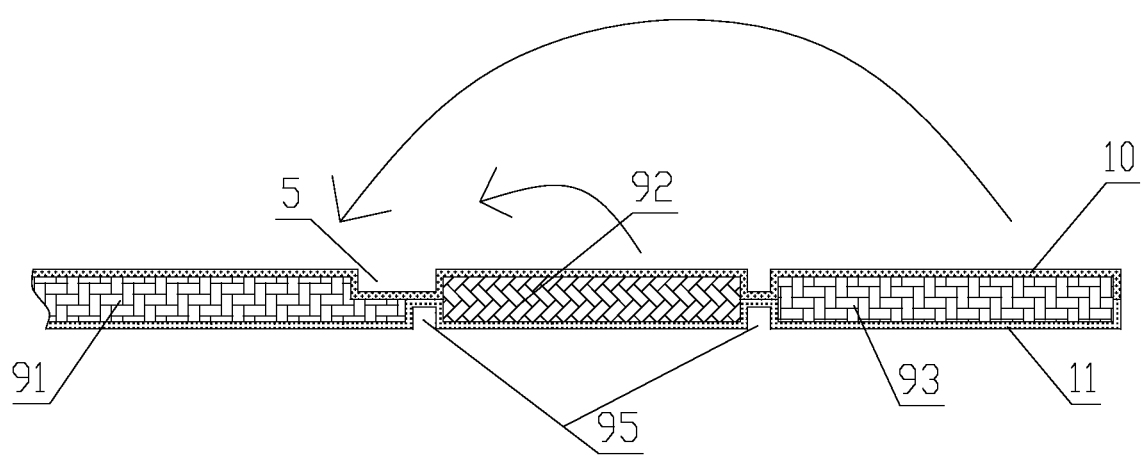
FIG. 4 is a partial sectional view showing a structure of the cover body in the disassembled state according to the first embodiment of the present disclosure.
Figure 5:
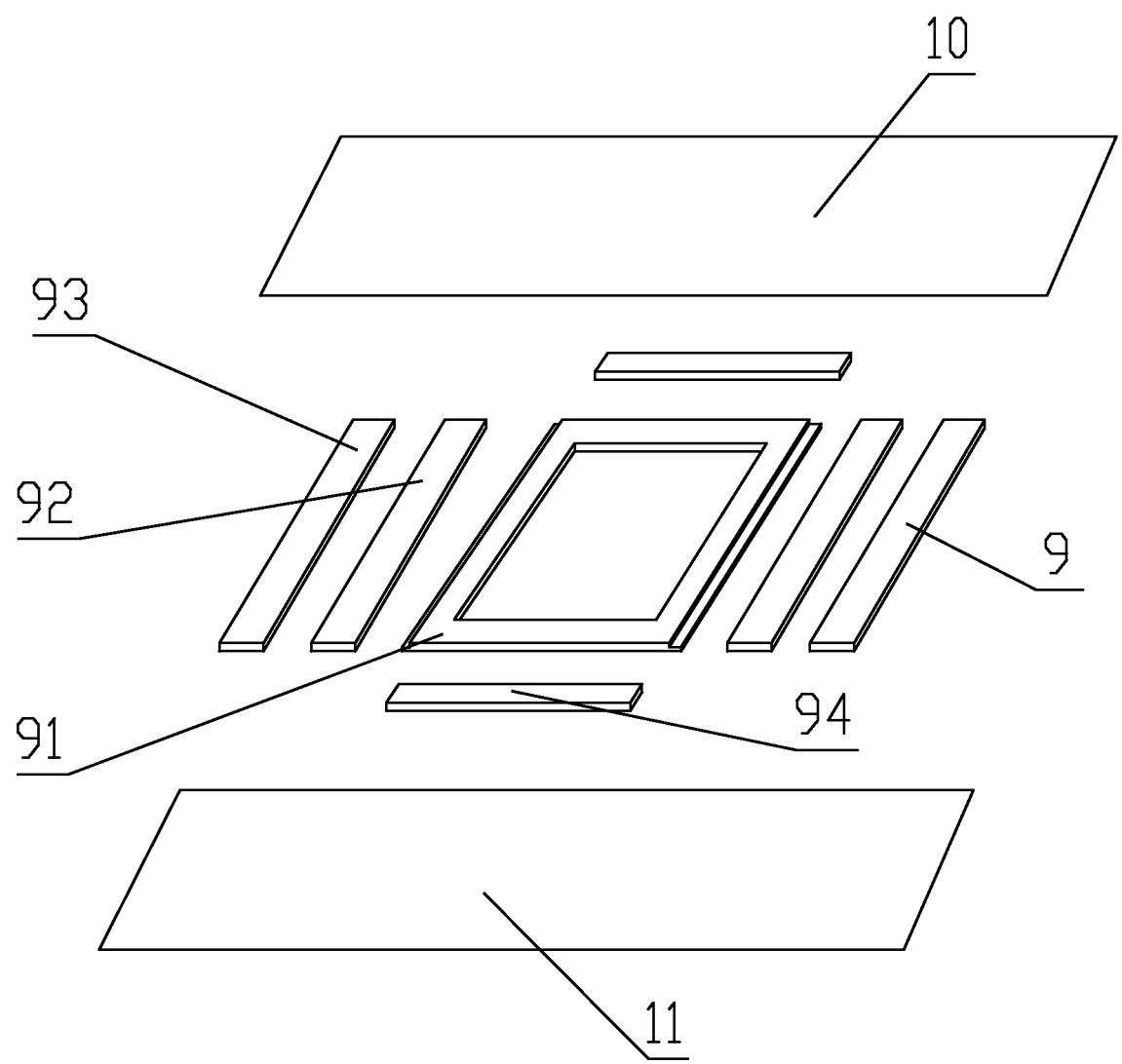
FIG. 5 is an exploded view showing major components of the cover body of the packing box according to the first embodiment of the present disclosure.
Figure 6:
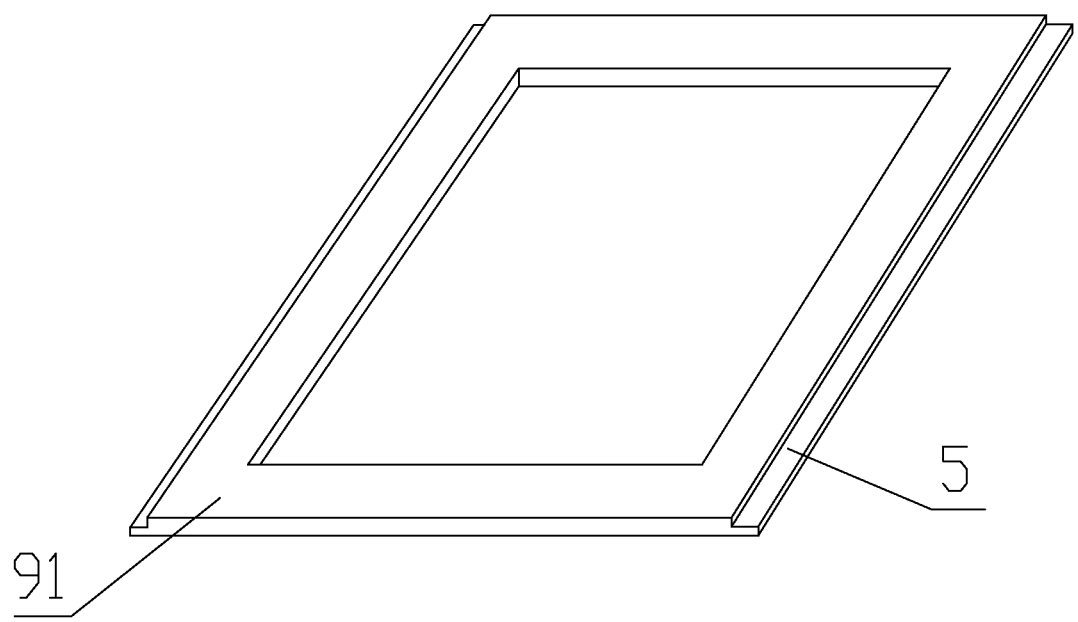
FIG. 6 is a schematic view showing a structure of a first paperboard layer unit according to the first embodiment of the present disclosure.

Each of the two cover bodies of the packing box is formed by a folded plate member. As shown in FIGS. 4 and 5, the plate member includes an internal flexible layer 10, an external flexible layer 11 and a paperboard layer 9 therebetween. In this embodiment, both the internal flexible layer 10 and the external flexible layer 11 are formed by packing paper, but other flexible materials such as a fabric is also possible.

The paperboard layer 9 includes a first paperboard layer unit 91, a second paperboard layer unit 92 and a third paperboard layer unit 93 both arranged on each of two paired opposite sides of the first paperboard layer unit 91 in an order from inside to outside of the cover body, and a fourth paperboard layer unit 94 arranged on each the other two paired opposite sides of the first paperboard layer unit 91. There exists a gap 95 between the first paperboard layer unit 91 and the second paperboard layer unit 92, between the second paperboard layer unit 92 and the third paperboard layer unit 93, as well as between the first paperboard layer unit 91 and the fourth paperboard layer unit 94. The step structure 5 is arranged on a side edge of the first paperboard layer unit 91 corresponding to (or close to) the second paperboard layer unit 92. The internal flexible layer 10 and the external flexible layer 11 are adhered on the paperboard layer 9. The first paperboard layer unit 91, the second paperboard layer units 92, the third paperboard layer units 93 and the fourth paperboard layer units 94 are combined with the internal and external flexible layers to form the bottom plate 1, the side plates 2, the flipping plates 3 and the closure plates 4. A rotation joint is formed between the bottom plate 1 and the side plate 2, between the side plate 2 and the flipping plate 3, as well as between the bottom plate 1 and the closure plate 4, due to the presence of the gaps 95, thereby enabling the folding of the side plates 2, the flipping plates 3 and the closure plates 4. As such, the packing box has a simple structure and is convenient to manufacture, thereby greatly increasing the production efficiency and decreasing the manufacturing cost.

The manufacturing process of the cover body mainly includes:

step A of forming the step structure 5 on the first paperboard layer unit 91 by a milling process, such as a half knife puncturing milling process, where the step structure 5 may be alternatively formed in forming the paperboard layer having multiple sub-layers, specifically in forming the first paperboard layer unit 91 with sub-layers having different lengths;

step B of laying the first paperboard layer unit 91, the second paperboard layer units 92, the third paperboard layer units 93 and the fourth paperboard layer units 94 on the external flexible layer 11 as per structure and size specifications;

step C of covering the internal flexible layer 10 on the paperboard layer 9 as laid, where the internal and external flexible layers are adhered onto the paperboard layer 9; and step D of adhering the pull tabs 8 and the flexible limitation slices 7 onto the internal flexible layer 10, thereby finishing the manufacturing process of the cover body.

Further, a transparent layer 12 may also be arranged in the central part of the bottom plate 1 of one of the two cover bodies of the packing box as desired, such that the article in the packing box is visible through the transparent layer 12.

Second Embodiment

This embodiment provides a packing box, which has a basic structure same as that in the first embodiment and is composed of two cover bodies configured to snap one another.

The packing box in the present embodiment is different from that in the first embodiment in that: the closure plate may be omitted, or may be substituted by a combination of the side plate and the flipping plate, depending on specifical actual packing requirements. The locating structure is not limited herein, as long as the locating structure can locate the free end of the flipping plate. For example, a groove is arranged on the free end of the flipping plate and a protrusion is arranged on a connection plate, so that the free end of the flipping plate can be fixed when the protrusion on the connection plate is inserted into the groove on the flipping plate. Again, for example, the flipping plate is prevented from displacing by a baffle arranged on the connection plate.

The technology principle has been described in combination with the embodiments as above. These description is just for explaining the principle of the present disclosure, and should not be construed as limiting the protection scope of the present disclosure in any way. In light of the explanation, those skilled in the art can easily conceive of other embodiments of the present disclosure without paying any inventive labour, and these embodiments will fall within the protection scope of the present disclosure.

The invention claimed is:

1. A packing box comprising two cover bodies configured to engaged with each other, wherein each of the cover bodies is formed by a folded plate member, and the plate member comprises an internal flexible layer, an external flexible layer and a paperboard layer between the internal flexible layer and the external flexible layer;

the cover body comprises a bottom plate, and a side plate and a flipping plate both arranged on each of at least two paired opposite sides of the bottom plate, wherein one side of the side plate is connected to the bottom plate, and the other side of the side plate is connected to the flipping plate, so that the side plate is foldable with respect to a side edge of the bottom plate that is connected with the side plate, and the flipping plate is foldable with respect to a side edge of the side plate that is connected with the flipping plate;

a locating structure is arranged between the bottom plate and the side plate, and a free end of the flipping plate is configured to be inserted and fixed to the locating structure wherein the locating structure is a step structure arranged on each of at least two paired opposite sides of the bottom plate, and the free end of the flipping plate is configured to abut on a step surface of the step structure;

wherein the paperboard layer comprises a first paperboard layer unit, and a second paperboard layer unit and a third paperboard layer unit both arranged on each of at least two paired opposite sides of the first paperboard layer unit in an order from inside to outside of the cover body, the first paperboard layer unit, the second paperboard layer unit and the third paperboard layer unit are separated from each other, the first paperboard layer unit and the second paperboard layer unit as well as the second paperboard layer unit and the third paperboard layer unit are connected by the internal flexible layer and the external flexible layer, a first gap is arranged between the first paperboard layer unit and the second paperboard layer unit and a second gap is arranged between the second paperboard layer unit and the third paperboard layer unit, and the step structure is arranged on a side edge of the first paperboard layer unit corresponding to the second paperboard layer unit.

2. The packing box of claim 1, wherein the step structure is formed by milling.

3. The packing box of claim 1, wherein the paperboard layer comprises a plurality of sub-layers, and the step structure is formed in forming the paperboard layer with sub-layers of different lengths.

4. The packing box of claim 1, wherein a pull tab is fixed to the internal flexible layer of the flipping plate, and a part of the pull tab is exposed when the free end of the flipping plate abuts on the step surface of the step structure.

5. The packing box of claim 1, wherein the side plate and the flipping plate are arranged on each of two paired opposite sides of the bottom plate, a closure plate is arranged on each of the other two paired opposite sides of the bottom plate, and the closure plate is foldable with respect to a side edge of the bottom plate that is connected with the closure plate.

6. The packing box of claim 5, wherein a flexible limitation slice is protruded outwards from each of two opposite ends of the closure plate, and a free end of the flexible limitation slice is configured to be attached to the internal flexible layer of the side plate, so that when the free end of the flipping plate abuts on the step surface of the step structure, the closure plate is perpendicular to the bottom plate under the action of the flexible limitation slices.

7. The packing box of claim 1, wherein the flipping plate is wider than the side plate by 0.5 mm to 1 mm.

8. The packing box of claim 1, wherein a width of the flipping plate is greater than or equal to a width of the side plate subtracted by a height of the step structure.

9. The packing box of claim 1, wherein a transparent layer is arranged in a central part of the bottom plate of one of the two cover bodies.

10. The packing box of claim 1, wherein the internal flexible layer and the external flexible layer are formed by fabric.

* * * * *